US000001068H

United States Statutory Invention Registration [19]

[11] Reg. Number: H1068

Huhmann

[43] Published: Jul. 7, 1992

[54] CMOS CAPACITIVE CHARGING CIRCUIT FOR ELECTRICAL DETONATORS

[75] Inventor: Douglas J. Huhmann, Kokomo, Ind.

[73] Assignee: The United States of America as represented by the Secretary of the Army, Washington, D.C.

[21] Appl. No.: 805,353

[22] Filed: Dec. 9, 1991

[51] Int. Cl.[5] ..... F42C 11/06

[52] U.S. Cl. ..... 102/218; 102/206

*Primary Examiner*—Charles T. Jordan

*Attorney, Agent, or Firm*—Anthony T. Lane; Edward Goldberg; Michael Sachs

[57] ABSTRACT

In an electrical detonator, an electrical circuit includes a network for charging the fire pulse capacitor. After battery activation and gun launch, but before arming, the circuit (via an n channel MOS transistor within the CMOS) operates to ground the fire pulse capacitor. At "arm minus 50 msec", the n channel is turned OFF and the p channel transistor is turned ON. This charges the fire pulse capacitor to the battery voltage within 50 msec. The CMOS issues an "ARM COMMAND" to fire the piston actuator (PA) discharging the fire pulse capacitor until PA fires. The fire pulse capacitor is recharged in the 50 msec interval between ARM and FIRE. Logic within the CMOS is used to monitor the fire pulse capacitor. These circuits will detect premature voltage on the fire pulse capacitor and DUD the fuze.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CMOS CAPACITIVE CHARGING CIRCUIT FOR ELECTRICAL DETONATORS

GOVERNMENT INTEREST

The invention described herein may be manufactured, used and licensed by or for the Government for Governmental purposes without the payment to me of any royalties thereon. The U.S. Government has rights in this invention pursuant to contract No. DAAK-10-84-C-0079 awarded by the Department of the Army, to Motorola, Inc.

FIELD OF THE INVENTION

This invention relates to detonators and particularly to an electronic circuit for controlling the firing of the detonator. The invention uses CMOS logic to monitor the fire pulse capacitor voltage and control its operation.

DESCRIPTION OF THE PRIOR ART

A variety of fuses are know which employ a capacitor to store energy to fire bridge wire detonators. These circuits generally employ a mechanical switch to control the discharge of a capacitor. In lieu of the mechanical switch, my invention employs semiconductor switches. MOS (metal-oxide semiconductor) logic transistors are characterized by small size and simple structure. MOS logic circuits have high component density, low power dissipation and high fan-out capability. This latter advantage comes about because of the high input impedance associated with the gate terminal of MOS devices. However, MOS logic circuits have the disadvantages of low operating speeds and low current-drive capability. In addition, MOS logic circuits often require two power supplies for proper operation. CMOS (complementary metal-oxide semiconductor) logic is also known to achieve significant improvements in switching speed an power dissipation. In CMOS logic circuits, both p and n devices are used in the circuit. The complementary devices are connected so that, at any given time, only one device is turned ON, and its complementary counterpart is OFF. Thus, at steady-state conditions, either the p or the n channel devices are OFF under all logic conditions, and negligible current flows. This results in extremely low power dissipation. The only substantial power dissipation occurs during switching when both the p and n channel devices may be ON simultaneously, for a short duration.

In CMOS logic circuits, the devices also function as "active loads" for each other during switching, where one tends to turn ON while its complement is turning OFF. This creates an internal positive feedback effect and sharpens the transfer characteristics between logic states.

SUMMARY OF THE INVENTION

The present invention replaces the mechanical switch of the prior art with a CMOS electronic switching circuit. The beneficial effects of this invention are:

1. The fire pulse capacitor is not charged until 50 msec prior to aiming;
2. The spin switch is decoupled from the fire pulse capacitor thus allowing a 50 msec spin switch discrimination to be performed;
3. Voltage cannot accumulate on the fire pulse capacitor before or at gun launch;

4. A higher impedance, less expensive spin switch is employed;
5. The CMOS logic can be used to monitor the fire pulse capacitor voltage and "DUD" the fuze if abnormal conditions exist; and
6. There is lower battery surge current and less battery drain when the fire pulse capacitor is charged.

In accordance with the invention, I provide an electrical circuit which includes a network for charging the fire pulse capacitor. After battery activation and gun launch, but before arming, the circuit (via the n channel MOS transistor within the CMOS) operates to ground the fire pulse capacitor. At "arm minus 50 msec", the n channel is turned OFF and the p channel transistor is turned ON. This charges the fire pulse capacitor to the battery voltage within 50 msec. The CMOS issues an "ARM COMMAND" to fire the piston actuator (PA) discharging the fire pulse capacitor until PA fires. The fire pulse capacitor is recharged in the 50 msec interval between ARM and FIRE.

Logic within the CMOS is used to monitor the fire pulse capacitor. These circuits will detect premature voltage on the fire pulse capacitor and DUD the fuze.

The invention includes a battery charging circuit comprising a battery connected to complementary CMOS p and n switching transistors. The output of the transistors is connected to control the charging and discharging of the fire pulse capacitor in accordance with a sequence of control events.

The invention controls the charging of a 68 mf capacitor which must fully charge to the battery voltage in less than 50 msec. The charge cycle is controlled by the size of the p channel transistor. This p channel transistor operates initially as a constant current source until the voltage of the transistor and then the capacitor charges with an RC time constant with "R" being the ON resistance of the p channel transistor.

This invention may be used in a variety of fuzes that employ a capacitor to store energy to fire bridge wire detonators.

The principal object and advantage of my invention is the provision of a CMOS logic network for controlling the charging of a fire pulse capacitor in a fuze. Another object of the invention is the provision of a CMOS logic circuit for testing the functions of the fuze and discharging the fire pulse capacitor to DUD the fuze if the tests indicate fuze malfunctions. A still further object and advantage of this invention is the provision of a fuze fire pulse capacitor charging network which operates with high speed and low power drain.

BRIEF DESCRIPTION OF THE DRAWINGS

These as well as further objects and advantages of the invention will become apparent to those skilled in the art from a review of the following detailed specification of my invention reference being made to the accompanying drawings in which.

DETAILED DESCRIPTION OF THE INVENTION

Figure 1:
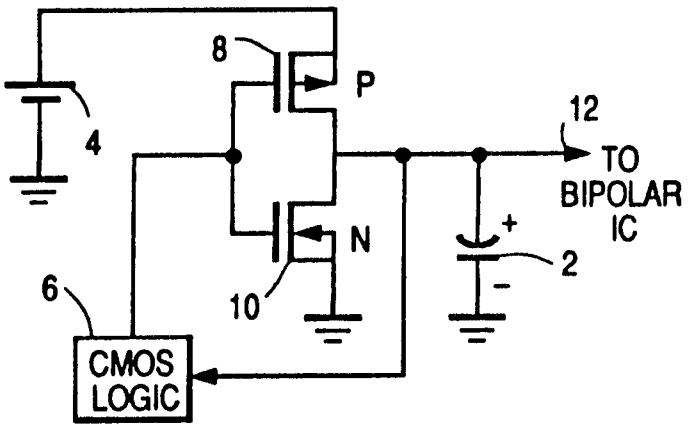
FIG. 1 is a schematic diagram of the preferred embodiment of the invention.

FIG. 1 is a schematic of the preferred embodiment of the invention. In FIG. 1, fire pulse capacitor 2 is charged from battery 4 via CMOS switching transistors 8 and 10. CMOS logic 6 controls the switching transistors 8 and 10.

In operation, after activation of battery 4 and gun launch, but before arming, the circuit (via the n channel MOS transistors 10 within the CMOS 6) operates to ground the fire pulse capacitor 2. At "arm minus 50 msec", the n channel transistor 10 is turned OFF and the p channel transistor 8 is turned ON. This charges the fire pulse capacitor 2 to the battery voltage within 50 msec. The CMOS 6 issues an "ARM COMMAND" to fire the piston actuator (PA), not shown, discharging the fire pulse capacitor 2 until PA fires. The fire pulse capacitor 2 is recharged in the 50 msec interval between ARM and FIRE.

Logic within the CMOS 6 is used to monitor the fire pulse capacitor 2. These circuits will detect premature voltage on the fire pulse capacitor 2 and DUD the fuze.

Figure 2:
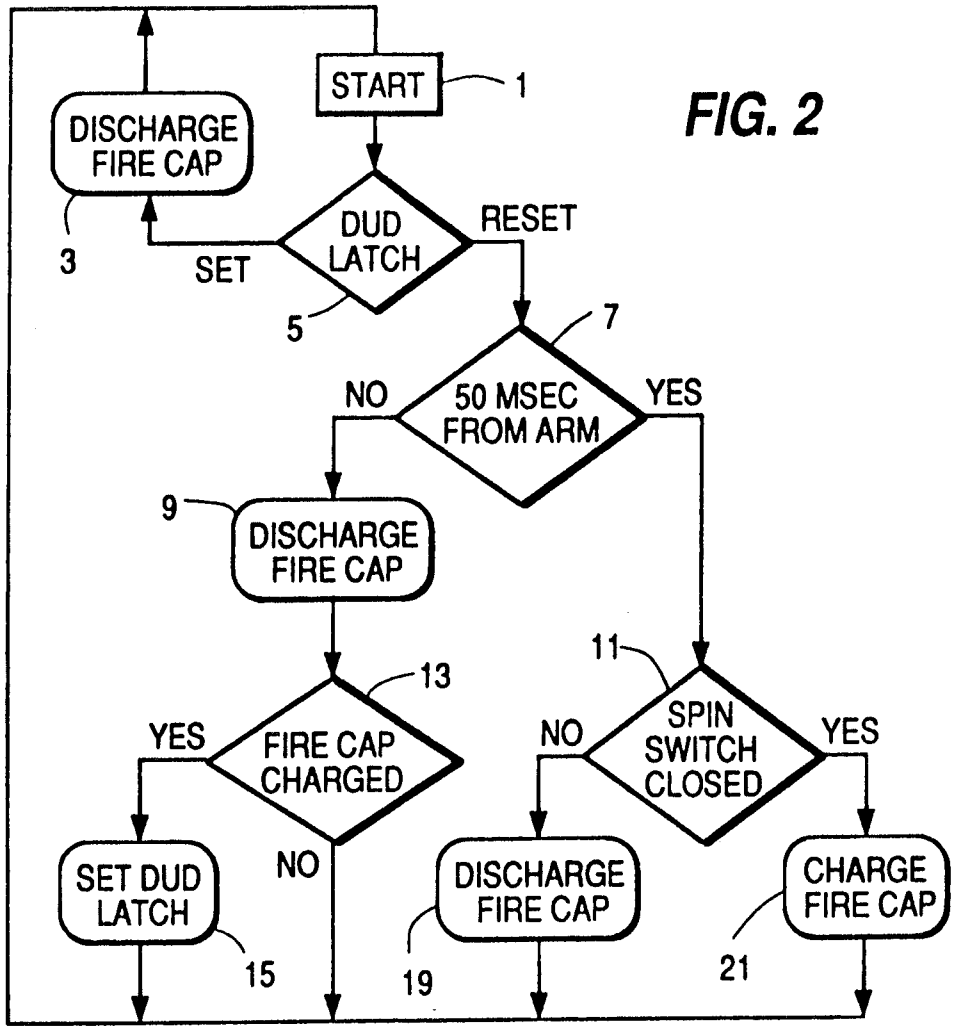
FIG. 2 is a flow chart of the control steps for the fire control capacitor.

In accordance with my invention, the operation of the fire pulse capacitor charging circuit is shown in FIG. 2. More particularly, the circuit operates with control to place DUD LATCH 5 in RESET. Then, in block 7, there is detected whether 50 msec is left from arm. If not, the capacitor is discharged (13) and the fuze is set to DUD (15). If so, the spin switch is tested (11) to see if it is closed. If not, the capacitor is discharged (19). If so, the capacitor is charged (21) for firing.

As can now be seen, the use of the CMOS logic provides a control capability which is not found in the conventional fire pulse capacitor networks. Several tests can be made to DUD the fuze by discharging the fire pulse capacitor to inhibit premature or otherwise undesired detonation. In the preferred embodiment, these tests are: the setting of the DUD latch, ensuring that there is at least 50 msec to arm, and that the spin switch is closed. The use of the CMOS logic also provides high speed, low power drain switching required in the detonation of explosive ordnance.

While several embodiments of the invention have been illustrated and described, it is apparent that many other variations may be made in the particular designs and configurations shown herein without departing from the scope of the invention set forth in the appended claims.

I claim:

1. An electrical detonator circuit including a network for charging a fire pulse capacitor, said electrical detonator circuit comprising: a fire pulse capacitor, a battery, means connected to said battery for activating said battery after gun launch but before arming; CMOS circuit means having an n channel MOS transistor and a p channel MOS transistor therein connected to said battery, said fire pulse capacitor and said battery activation means for initially grounding said fire pulse capacitor via said n channel MOS transistor, and thereafter, at arm minus 50 msec, means in said CMOS for turning OFF said n channel MOS transistor to charge said fire pulse capacitor to said battery voltage within said 50 msec, and means in said CMOS for generating an ARM COMMAND for firing a detonator and discharging said fire pulse capacitor until said detonator fires.

2. A fire pulse capacitor charging circuit for a detonator comprising: fire pulse capacitor means for controlling the detonation of a fuze, battery means connected to said fire pulse capacitor means for charging said fire pulse capacitor, the CMOS control and switching means connected to aid battery means and said fire pulse capacitor means for controlling the charging and discharging of said fire pulse capacitor means.

3. An electrical detonator circuit including a network for charging a fire pulse capacitor comprising: a fire pulse capacitor; a battery; CMOS switching circuit means having an n channel MOS transistor and a p channel MOS transistor therein connected between said battery and said fire pulse capacitor for first grounding said fire pulse capacitor via said n channel MOS transistor, and then turning OFF said n channel MOS transistor and turning on said p channel MOS transistor to charge said fire pulse capacitor to said battery voltage.

4. The detonator circuit of claim 3 further including means in said CMOS circuit means connected to said battery for activating said battery after launch but before arming.

5. The detonator circuit of claim 4 further including means in said CMOS circuit means for detecting whether at least a predetermined period of time remains before ARM and for discharging said fire pulse capacitor if less then said predetermined period of time is detected.

6. The detonator circuit of claim 5 further including a spin switch; means in said CMOS circuit means connected to said spin switch for detecting whether said spin switch is OPEN or CLOSED and discharging said fire pulse capacitor if said spin switch is OPEN or CLOSED and discharging said fire pulse capacitor if said spin switch is OPEN.

7. The method of safely controlling the detonation of a fuze using a CMOS control circuit comprising the steps of:

setting the fuze DUD LATCH to a position so as to enable the charging of a fire pulse capacitor; detecting whether a predetermined minimum amount of time remains to ARM the fuze; discharging the fire pulse capacitor and setting the fuze DUD LATCH to a DUD position if less then said predetermined period of time remains to ARM the fuze or charging the fire pulse capacitor if said predetermined minimum amount of time is detected; detecting whether the fuze spin switch is in a predetermined position to ARM the fuze; discharging the fire pulse capacitor and setting said fuze DUD LATCH to a DUD position if the spin switch is not in said predetermined position or continuing to charge said fire pulse capacitor if said spin switch is in said predetermined position; and detonating said fuze if said predetermined minimum amount of time remains and said spin switch is in the said predetermined position.

8. The method of controlling the detonation of a fuze using a CMOS control circuit comprising the steps of:

setting the DUD LATCH to RESET to enable the charging of the fire pulse capacitor; detecting whether at least 50 msec is remaining to arm; discharging the fire pulse capacitor and setting the fuze to DUD if less then 50 msec remains to ARM; detecting whether the spin switch is closed; discharging the fire pulse capacitor and setting said fuze to DUD if the spin switch is open or continuing to charge said fire pulse capacitor if said spin switch is closed; and detonating said fuze.

* * * * *